United States Patent [19]

Mazzagatti

[11] 4,431,327

[45] Feb. 14, 1984

[54] FAST SELF-ADJUSTING ASSEMBLING ARRANGEMENT FOR SHAFTS AND ROTARY MEMBERS

[76] Inventor: Concezio Mazzagatti, Santa Fe 3786,4° A, Buenos Aires, Argentina

[21] Appl. No.: 341,127

[22] Filed: Jan. 20, 1982

[30] Foreign Application Priority Data

Feb. 9, 1981 [AR] Argentina ............................... 284246

[51] Int. Cl.³ ........................... B25G 3/00; F16D 1/00; F16G 11/00
[52] U.S. Cl. ...................................... 403/11; 403/353; 418/57; 418/63; 418/69; 418/70
[58] Field of Search .................... 123/230; 418/57, 63, 418/69, 70; 403/345, 353, 11

[56] References Cited

U.S. PATENT DOCUMENTS

| | | | |
|---|---|---|---|
| 1,902,065 | 3/1933 | Frelin | 418/69 |
| 1,929,998 | 10/1933 | Wilson | 418/63 |
| 3,356,291 | 12/1967 | Kennedy | 418/57 |
| 3,823,694 | 7/1974 | Mazzagatti | 123/230 |
| 4,265,605 | 5/1981 | Ito | 418/63 |

*Primary Examiner*—Wayne L. Shedd
*Attorney, Agent, or Firm*—Watson, Cole, Grindle & Watson

[57] ABSTRACT

A self-adjusting assembling arrangement, where a shaft can be properly and quickly fitted within a cylindrical body member, which becomes resiliently supported on the shaft. The body member may form part of a rotatory piston member eccentrically mounted within a cylindrical casing, or of a wheel.

7 Claims, 6 Drawing Figures

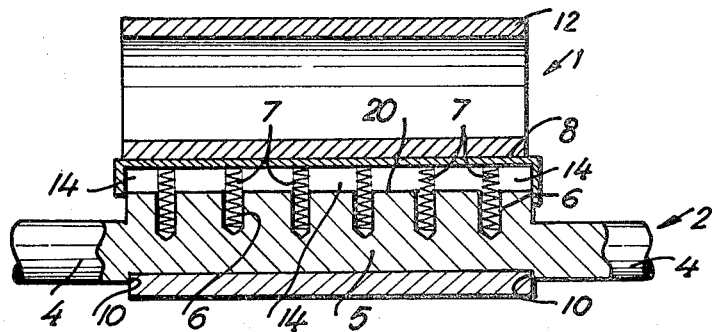
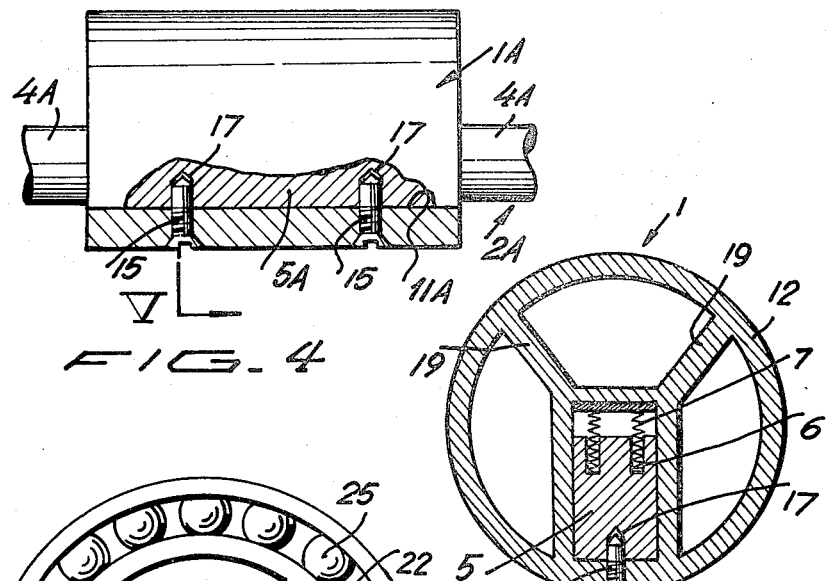
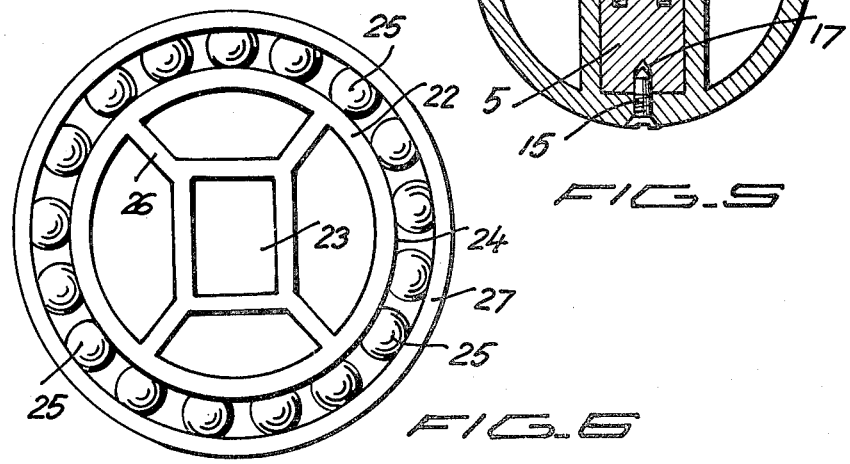

FAST SELF-ADJUSTING ASSEMBLING ARRANGEMENT FOR SHAFTS AND ROTARY MEMBERS

BACKGROUND OF THE INVENTION

1. Field of the Invention

The present invention relates basically to a fast, self-adjusting assembling arrangement for resiliently but fully clutching a rotary body member to a shaft.

The present invention may be applied to rotary piston engines where the above referred to rotary body member will form part of the piston which eccentrically rotates in a casing, and due to its rolling contact with the inner wall of the casing, separates the casing into two spaced apart variable volume chambers, as is well known in the art. The present invention is also applicable to quite different fields, such as for instance to wheels for motor cars and the like.

2. Description of the Prior Art

Since the field to which the invention may be applied is extremely broad and heterogeneous, it becomes somewhat difficult to make comments in connection with the prior art. With regard to rotary piston engines of the type where a cylindrical housing is provided within which a rotor rotates about an eccentrically located shaft and rolls along the inner wall casing and where usually a movable diaphragm is in abutting contact with the rotor, such rotor is subject to wear and tear and therefore has to be removed quite frequently from its housing for replacement. Fast and correct mounting of a new rotor or parts thereof, such as by a snap-action, is therefore an aim of the invention and has not been suggested in the past.

SUMMARY OF THE INVENTION

Bearing in mind the foregoing explanation in connection with the wear and tear of rotors, the present invention provides a fast, self-adjusting assembling arrangement to resiliently but fully clutch a rotary body member to a shaft, whereby a fast replacement of worn parts can be achieved. Furthermore, because the rotary body member is resiliently supported on the shaft, the wear and tear is less than in the known embodiments, thus considerably increasing the length of life of such a rotary piston engine.

The present invention is also applicable to other fields, where a rotary body member is to be mounted on a shaft, as will be later explained.

In order to facilitate the comprehension of the present invention, reference will now be made to several preferred embodiments in order to illustrate the different fields to which the invention may be applied.

BRIEF DESCRIPTION OF THE DRAWINGS

FIG. 3 is a side elevation, partially in section along line III—III of FIG. 2, but without showing the rotary piston member and ball bearing arrangement.

FIG. 4 is a side elevation, partially in section, similar to FIG. 3 of an alternative embodiment as far as the blocking means are concerned, which are capable of lengthwise immobilizing the shaft with regard to the rotary body member.

FIG. 5 is a cross section along line V—V of FIG. 4.

FIG. 6 is a schematic showing of an alternative embodiment, where the organization of the rotary body member is different from that of the previous embodiments.

DETAILED DESCRIPTION OF THE PREFERRED EMBODIMENTS OF THE INVENTION

Figure 1:
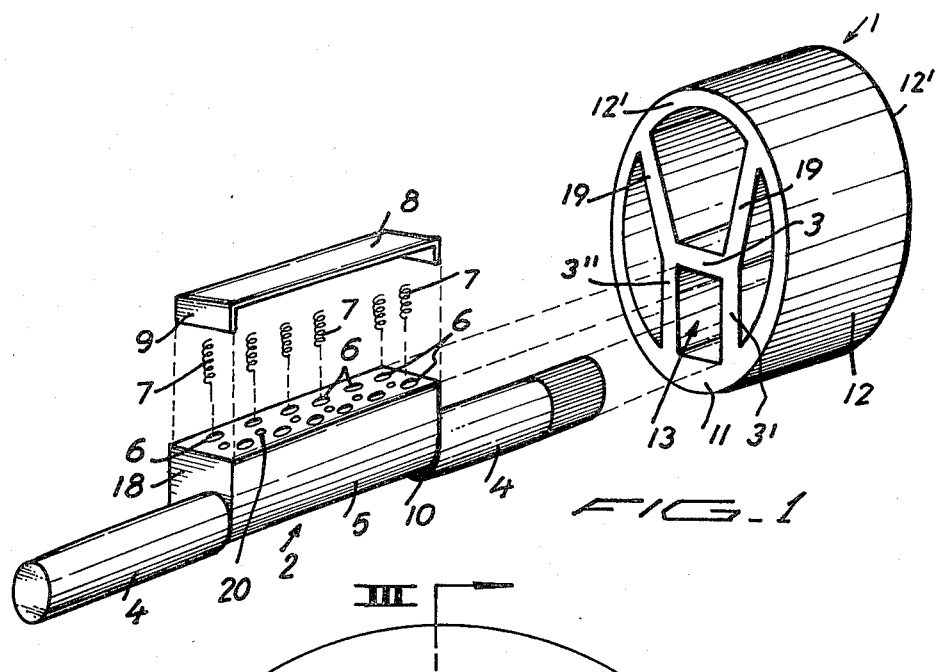
FIG. 1 is an exploded perspective view of a fast self-adjusting assembling arrangement, in accordance with the present invention.

Referring first to FIG. 1, a fast, self-adjusting assembling arrangement according to the present invention is shown, consisting of a generally cylindrical rotary body member 1 and a shaft 2 on which the body member 1 is to be eccentrically mounted. To this end shaft 2 comprises two rod-like coaxial end portions 4, in between which there is a non-circular intermediate portion 5, the lowermost portion of which is located above the lowermost portion of the rod-like coaxial end portions 4, thereby forming in between them a respective step 10. The intermediate portion 5 defines an upper flat face 20 and end faces 18 which are substantially coplanar with the pertinent cross portions of the end portions 4 and which define the respective steps 10.

The intermediate portion 5 has a number of spaced apart, blind perforations 6, defining respective housings for springs 7. The perforations end in the upper flat face 20 in such a way that the springs 7 become partially housed in the perforations 6 and project out of the flat face 20 upon the springs being in uncompressed state. A cover member 8 having preferably end wings 9 which can slide along end faces 18 enable to press down the springs 7, so that they become completely housed within the blind perforations 6 and the cover member 8 becoming then a proper lid for the intermediate portion 5.

Reverting now to the rotary body member 1, the latter is hollow, generally cylindrical, and defines a side face 12 and end faces 12'. The body member 1 defines in this embodiment within its hollow portion an eccentrically located, lengthwise oriented, non-circular bore 13 formed by its bottom wall 11 which is part of the generally cylindrical member, a pair of spaced apart parallel side partitions 3',3" and a top partition 3 linking the side partitions whereby the bore 13 is of rectangular cross sectional area. The side partitions 3',3" and top partitions 3 are in turn linked to a pair of diverging spacer partitions 19 which are furthermore integral with the generally cylindrical side face 12, thereby providing a rotary body member which is sturdy and yet light in weight.

In order to assemble the shaft 2 with the rotary body member, all that has to be done is to press down the lid 8 to enter into contact with the upper flat face 20 and then to lengthwise move the shaft 2 through the bore 13 until the non-circular intermediate portion becomes completely housed within the bore 13, whereby the steps 10 will face the front and rear faces 12' and at the same time the springs 7 will urge the cover member 8 towards the top partition 3 and the shaft 2 in a relative movement in opposite direction, so that the steps 10 will face the front and rear faces 12', respectively, thereby not only clutching the shaft 2 to the rotary member 1, but also providing complementary blocking means capable of lengthwise immobilizing the shaft 2 with regard to the rotary body member 1. The face of the top partition 3 which faces the bottom wall 11 may also be called a "roof". As may be best appreciated in FIG. 3, the space defined between the upper face 20 and the cover member 8 upon the springs 7 being expanded to their maximum extent should be larger than the height of the steps 10 in order to enable the shaft 2 to be withdrawn from the rotary body member 1, as will be obvious to those skilled in the art.

Figure 2:
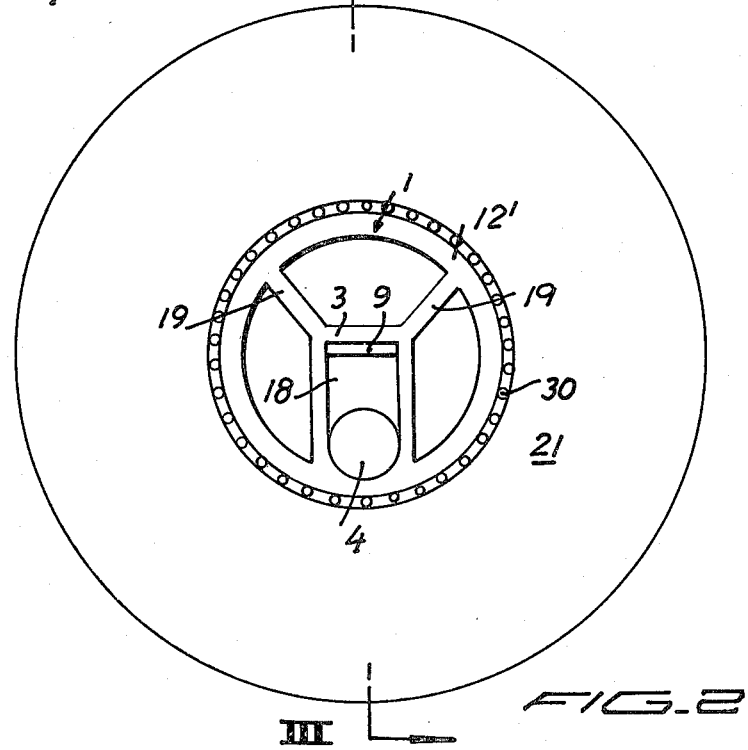
FIG. 2 is an end view of an assembled shaft and rotary body member, on which a rotary piston member is mounted.

Reverting now to FIG. 2, a ball bearing arrangement 30 is mounted on the generally cylindrical side face 12 and in turn on the ball bearing arrangement 30, a schematically illustrated rotary piston member 21 is mounted. It will be understood from the foregoing that if the arrangement as disclosed in FIG. 2 is mounted in a cylindrical casing in such a way that the shaft end portions 4 are eccentrically journalled in the lids or cover members of the cylindrical housing, then the piston member will be able to eccentrically rotate within the housing, thereby defining a rotary piston engine of the type disclosed for instance in FIG. 14 of my earlier U.S. Pat No. 3,823,694. Due to the springs 7, the piston member 21 will be resiliently urged against the inner wall of its casing along which it rotates, and thus less wear and tear will take place. However, if replacement is necessary, it will be immediately understood that by merely pressing down the cover member 8 onto the upper flat face 20, the shaft 2 may be easily withdrawn from the rotary body member 1 for inspection or replacement of parts.

While the cover member 8 is conveniently provided with end wings 9 for proper guidance, a flat cover member without such wings 9 could likewise be provided, and once the non-circular intermediate portion 5 is properly housed in the eccentrically located, lengthwise oriented, non-circular bore 13, the cover member may even be withdrawn.

The complementary blocking means defined by steps 10 can be replaced by another structure, as the one disclosed in FIG. 4. In this embodiment the coaxial rod-like end portions 4A are merely connected to the non-circular intermediate portion 5A. In other words, no steps of the type of steps 10 are formed. Thus the manufacture of the shaft 2A is somewhat cheaper. In this, the bottom portion of the non-circular intermediate portion 5A is provided with blind bores 17 and the bottom portion of the rotary body member 1A supports inwardly projecting screws or pins 15 which project out of the bottom wall 11A. The projecting portions of the screws 15 have a cross sectional area and a length which is smaller than that of the blind bores 17 within which they are adapted to enter, thus providing another type of blocking means. The springs (see reference numeral 7 in FIG. 1) enable the shaft 2A more upwardly within the rotary body member 1A in order to enable the rotary body member to be withdrawn from the shaft, upon the free ends of the screws 15 becoming removed from the blind bores 17.

While in the embodiments so far described, the rotary body member 1, 1A was conveniently eccentrically located on shaft 2, 2A, respectively, in case the rotary body member should form part of a wheel, pulley or the like structure, where no eccentricity is required, the embodiment of FIG. 6 can be used. Here a generally cylindrical hollow rotary body member 22 is shown, having a rectangular cross sectional bore 23 located within the middle portion of the cylindrical space defined by the body member 22 by means of diagonally arranged partitions 26.

In other words, the center of bore 23 is coaxial with the longitudinal axis (not shown) of the body member 22, while in the previously described embodiments this is not the case.

On the outside cylindrical face 24 of the body member 22, a ball bearing arrangement 25 exists, the outer race 27 of which may form part of a wheel, pulley or the like. As to the shaft, either of the arrangements as described in connection with shafts 2 and 2A may be used. This type of wheel, when used for motor cars, will require shock absorbers of small size than in the known wheel arrangements.

It will be understood that improvements may be introduced in the embodiments described by way of example, and modifications may be made in the construction and material employed, without departing from the scope of the invention.

I claim:

1. A fast, self-adjusting assembling arrangement for resiliently and fully coupling a rotary body member to a shaft, said body member being generally cylindrical and defining a lengthwise oriented non-circular bore, having a roof and a bottom, said shaft including a non-circular intermediate portion, lengthwise slidably housable into said bore, said intermediate portion having a face spaced apart from said roof, resilient means located between said face and said roof and urging said intermediate portion of said shaft towards said bottom, and complementary blocking means which longitudinally immobilizes said shaft with regard to said rotary body member.

2. The fast, self-adjusting assembling arrangement of claim 1, wherein said body member is hollow, defining a space and said non-circular bore is defined by partitions within the space defined by said body member.

3. The fast, self-adjusting assembling arrangement of claim 2, wherein said non-circular bore, defined by partitions, is eccentrical with regard to the longitudinal axis of said body member, said bore having a bottom wall forming part of said body member, a pair of parallel side partitions joined by a top partition, said side and top partitions being unitary with a pair of diverging spacer partitions also connected to said body member.

4. The fast, self-adjusting assembling arrangement of claim 3, wherein said non-circular intermediate portion of said shaft has an upper flat face, spaced apart perforations in said intermediate portion ending in said upper flat face, springs housed in said perforations projecting out of said upper flat face upon being in uncompressed state, a cover member on top of said springs and which is received in abutting relationship with said top partition.

5. The fast, self-adjusting assembling arrangement of claim 1, wherein said shaft has a pair of coaxial end portions in between which there is said intermediate portion, said complementary blocking means consist of steps formed between said non-circular intermediate portion and the end portions of said shaft.

6. The fast, self-adjusting assembling arrangement as claimed in claim 1, wherein said complementary blocking means consist of pin-like projections projecting into said non-circular bore, said non-circular intermediate portion of said shaft having blind bores which house said pin-like projections.

7. The fast, self-adjusting assembling arrangement of claim 1, wherein said rotary body member is generally cylindrical, defining a longitudinal axis, said non-circular bore is coaxial with said longitudinal axis, said body member defining an outside cylindrical face, a ball bearing arrangement being mounted on said outside cylindrical face and defining an outer annular member.

* * * * *